(12) United States Patent
Mori

(10) Patent No.: US 8,340,418 B2
(45) Date of Patent: Dec. 25, 2012

(54) IMAGE PROCESSING APPARATUS, MOBILE WIRELESS TERMINAL APPARATUS, AND IMAGE DISPLAY METHOD

(75) Inventor: Hirofumi Mori, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1057 days.

(21) Appl. No.: 12/326,188

(22) Filed: Dec. 2, 2008

(65) Prior Publication Data

US 2009/0304279 A1 Dec. 10, 2009

(30) Foreign Application Priority Data

Jun. 10, 2008 (JP) ................................ 2008-151831

(51) Int. Cl.
*G06K 9/00* (2006.01)
*H04B 1/38* (2006.01)
(52) U.S. Cl. ......... 382/168; 382/169; 382/274; 382/254
(58) Field of Classification Search .................. None
See application file for complete search history.

(56) References Cited

U.S. PATENT DOCUMENTS

2007/0109317 A1* 5/2007 Minakuchi et al. ........... 345/604
2007/0268242 A1* 11/2007 Baba et al. .................... 345/102

FOREIGN PATENT DOCUMENTS

| JP | 2002-108305 A | 4/2002 |
| JP | 2004-325628 A | 11/2004 |
| JP | 2006-293365 A | 10/2006 |
| JP | 2007-142500 A | 6/2007 |
| JP | 2007-284141 A | 11/2007 |
| JP | 2007-310232 A | 11/2007 |

OTHER PUBLICATIONS

Japanese Office Action dated May 25, 2010 and English translation thereof issued in counterpart Japanese Application No. 2008-151831.

* cited by examiner

*Primary Examiner* — Atiba O Fitzpatrick
*Assistant Examiner* — Thomas A James
(74) *Attorney, Agent, or Firm* — Holtz, Holtz, Goodman & Chick, PC

(57) ABSTRACT

A histogram generating function generates a histogram by counting the number of pixels included in each tone for each tone of an input video signal. A peak luminance gain calculation function calculates the gain value of a peak luminance on the basis of the histogram. A tone conversion function calculation function generates a lookup table for obtaining an output tone by correcting an input tone on the basis of the histogram and the gain value, and records the table in a tone conversion lookup table storage unit. A tone-converted image generating function which executes the correction processing of correcting the tone of an input video signal on the basis of the tone conversion lookup table.

8 Claims, 8 Drawing Sheets

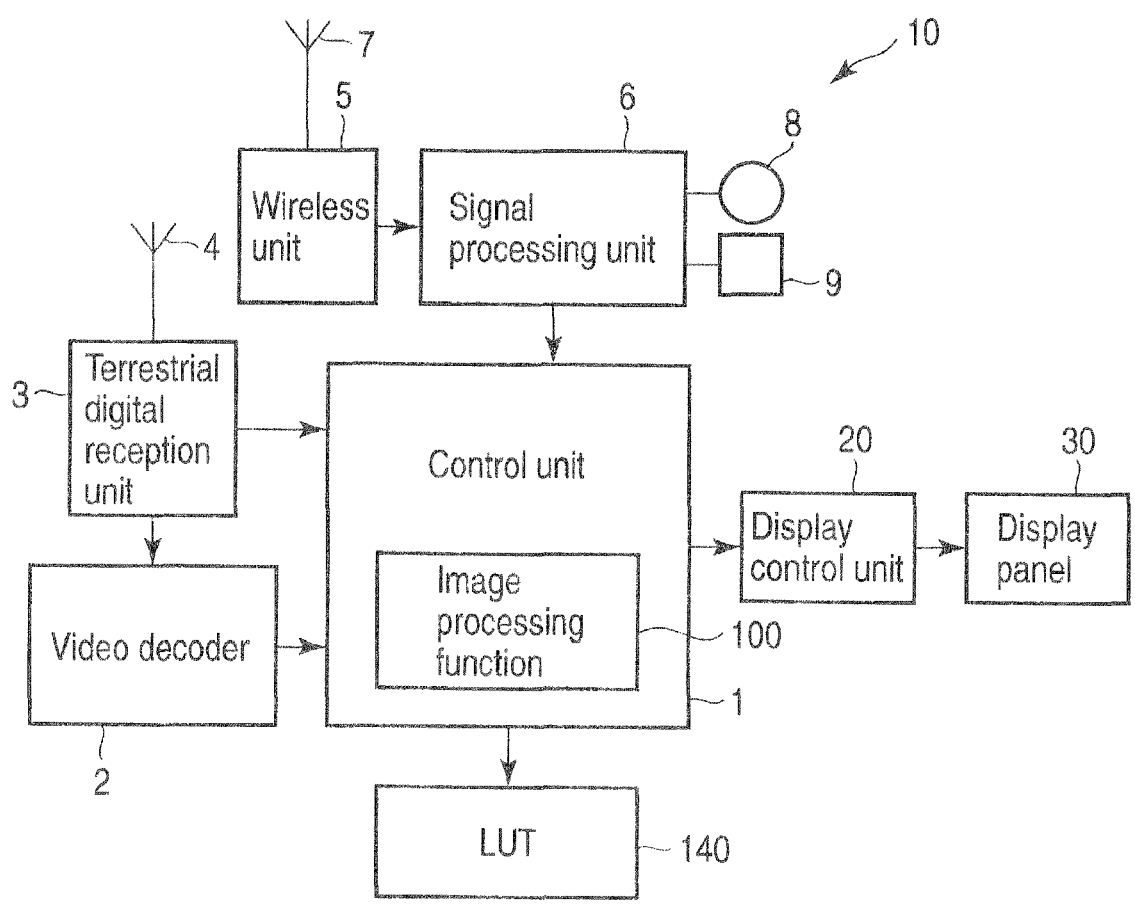
F I G. 1

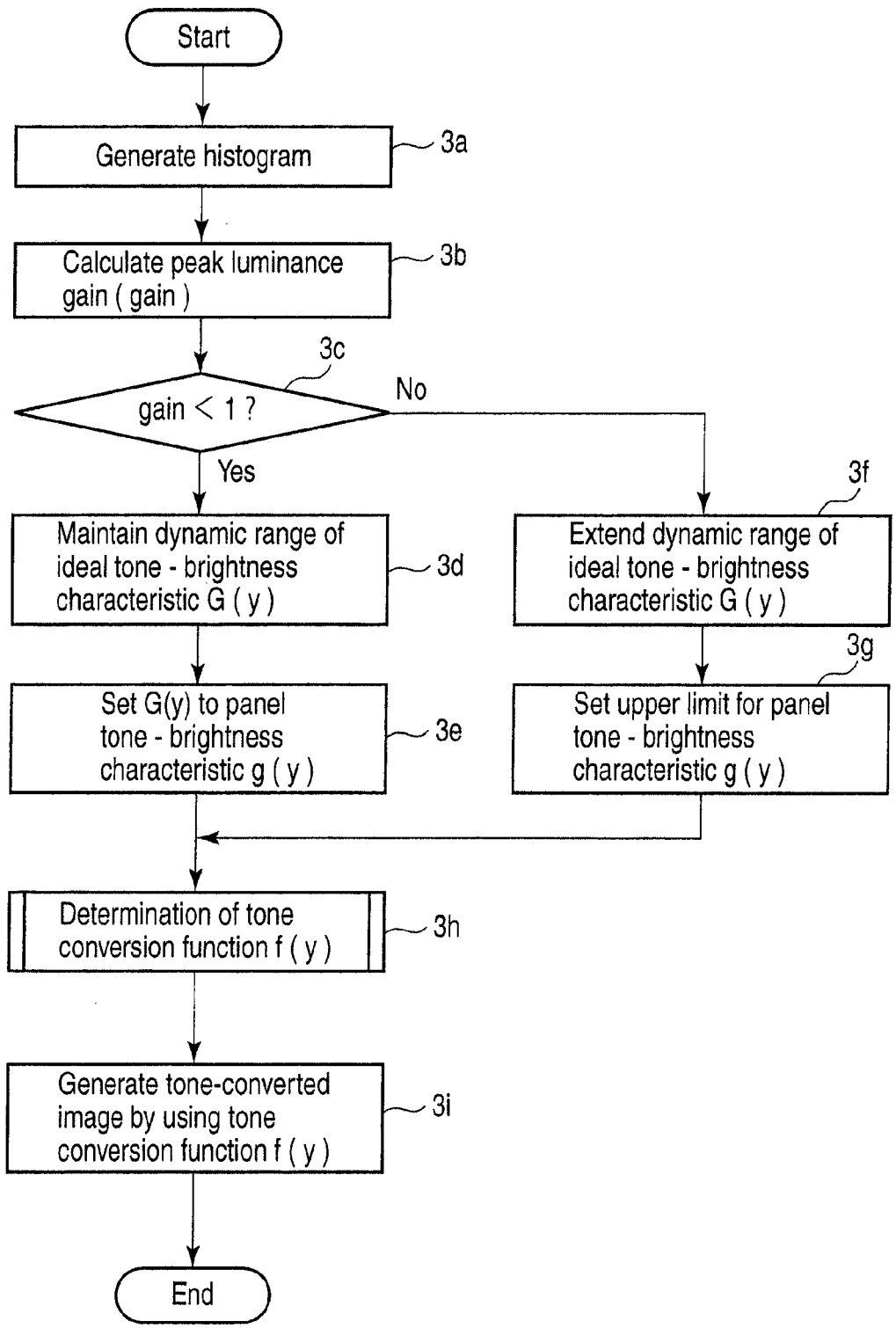
F I G. 3

IMAGE PROCESSING APPARATUS, MOBILE WIRELESS TERMINAL APPARATUS, AND IMAGE DISPLAY METHOD

CROSS-REFERENCE TO RELATED APPLICATIONS

This application is based upon and claims the benefit of priority from prior Japanese Patent Application No. 2008-151831, filed Jun. 10, 2008, the entire contents of which are incorporated herein by reference.

BACKGROUND OF THE INVENTION

1. Field of the Invention

The present invention relates to an image processing apparatus used for, for example, a display apparatus using an OLED (Organic Light Emitting Diode).

2. Description of the Related Art

As is generally known, a conventional image processing apparatus performs both luminance modulation for a light source in accordance with an input video and tone conversion of the input video to suppress a reduction in contrast due to light leakage from an LCD or the like. This technique can perform display upon reconstructing the original tonality the input video has, but cannot perform tone correction better than the original tonality (see, for example, Japanese Patent Application No. 2007-284141).

In addition, in a device in which importance is attached to suppression of power consumption, like a cellular phone, low luminance is set as compared with a television set using commercial power. For this reason, the above correction cannot implement sufficient tone correction. It is therefore difficult to improve the tonality of a scene with low visibility, such as a dark scene.

A self-luminous display panel typified by an OLED has a problem that as the brightness of the panel is increased to improve the visibility of a dark scene, the power consumption increases at the time of display of the bright scene.

BRIEF SUMMARY OF THE INVENTION

The present invention has been made to solve the above problem, and has as its object to provide an image processing apparatus which can improve the tonality of a scene with low visibility, such as a dark scene, even with a low luminance setting, and reduce the power consumption for a scene in which the power consumption increases, such as a bright scene.

To achieve this object, the present invention is a mobile communication apparatus. The mobile communication apparatus comprises a histogram generating unit which generates a histogram of a video based on an input video signal for each tone; a gain calculation unit which obtains a peak luminance gain on the basis of the histogram; a dynamic range extending unit which extends a dynamic range of a preset first characteristic between tone and brightness in accordance with the gain; a function generating unit which generates a tone conversion function of converting a tone on the basis of the first characteristic extended by the dynamic range extending unit, a second characteristic between tone and brightness of the display panel, and the histogram; and a tone conversion unit which generates the video signal corrected by converting the tone of the input video signal on the basis of the tone conversion function.

Therefore, according to the present invention, since tone correction for a dark portion is performed by converting the tone of an input video signal in accordance with the input video signal, an image processing apparatus, mobile wireless terminal apparatus, and image display method can be provided, which can improve the tonality of a scene with low visibility such as a dark scene even with a low luminance setting.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the arrangement of the main part of a cellular phone including an image processing apparatus according to the present invention;

FIG. 3 is a flowchart for explaining the operation of the tone conversion function calculation function of the image processing apparatus shown in FIG. 2;

DETAILED DESCRIPTION OF THE INVENTION

Figure 2:
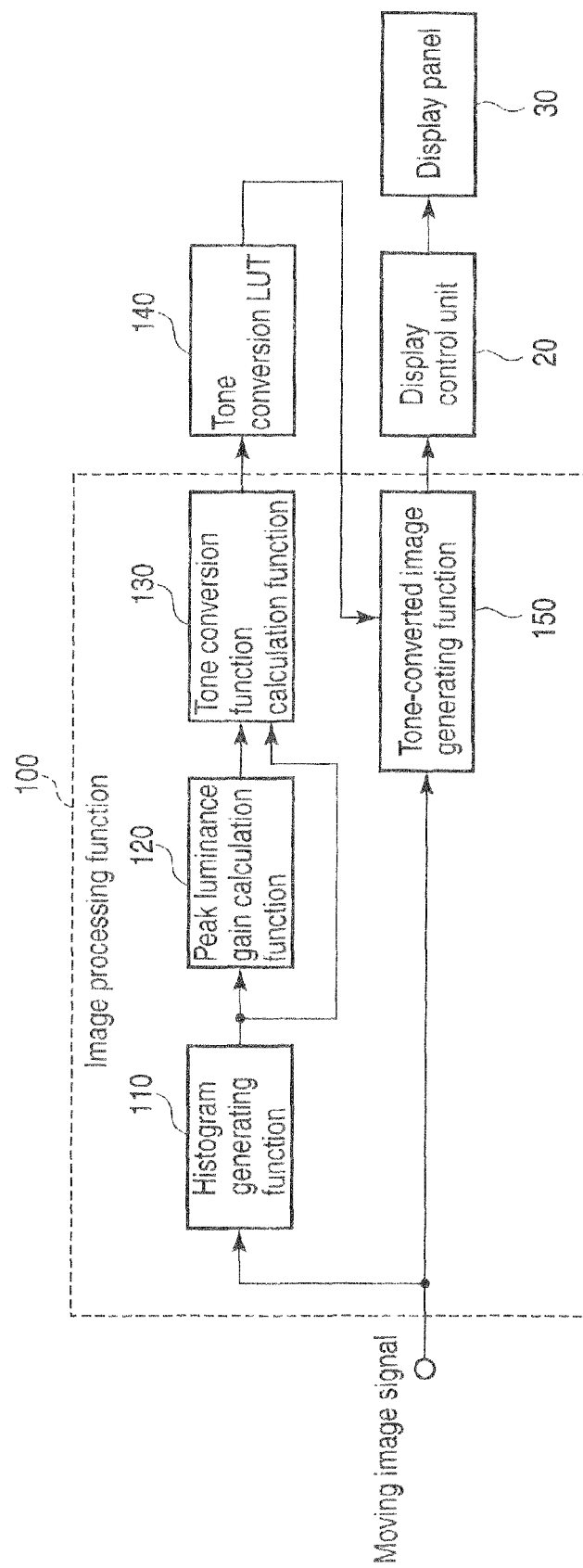
FIG. 2 is a block diagram showing the arrangement of an image processing function shown in FIG. 1.

An embodiment of the present invention will be described below with reference to the views of the accompanying drawing.

FIG. 1 is a block diagram showing the schematic arrangement of a cellular phone (mobile communication apparatus) 10, which includes an image processing apparatus according to an embodiment of the present invention. The cellular phone 10 comprises a control unit 1, which controls various operations of the cellular phone 10; a video decoder 2, which decodes a coded moving image signal; a terrestrial digital reception unit 3, which captures a TS (Transport Stream) packet by demodulating a broadcast signal of the terrestrial digital television broadcast signals received via an antenna 4 which corresponds to the channel designated by the control unit 1; a wireless unit 5 which obtains a baseband signal by demodulating the wireless signal received from a base station via an antenna 7; a signal processing unit 6 which obtains a speech signal, a control signal, and a data signal by decoding a baseband signal in conformity to a scheme such as CDMA, and also codes the speech signal, control signal, and data signal transmitted via the antenna 7; a loudspeaker 9, which outputs the speech signal transmitted from the signal processing unit 6; a microphone 8, which captures speech from a speaker; and a display control unit 20, which performs display control of a video signal on a display panel 30 on the basis of the moving image signal received from the control unit 1.

Note that the above image processing apparatus comprises an image processing function 100 and a tone conversion lookup table storage unit (LUT) 140 in FIG. 1. This is because this embodiment is based on the assumption that the main functions of image processing are implemented by programs.

FIG. 2 is a functional block diagram showing the processing performed by the image processing function 100 in more detail.

The image processing function 100 comprises a histogram generating function 110, a peak luminance gain calculation function 120, a tone conversion function calculation function 130, and a tone-converted image generating function 150.

The histogram generating function 110 generates a histogram by counting the number of pixels constituting a moving image signal (YUV) output from the video decoder 2 for each tone on the basis of the moving image signal.

The peak luminance gain calculation function 120 calculates a peak luminance gain value on the basis of the histogram generated by the histogram generating function 110.

The tone conversion function calculation function 130 generates, on the basis of the histogram generated by the histogram generating function 110 and the gain value calculated by the peak luminance gain calculation function 120, a lookup table for obtaining an output tone by correcting an input tone. The tone conversion function calculation function 130 then records the lookup table in the tone conversion lookup table storage unit 140 secured in the work memory of the control unit 1. Note that the tone conversion lookup table is a table in which input tones are made to correspond to output tones after correction, and corresponds to a tone conversion function.

The tone-converted image generating function 150 executes the correction processing of correcting the tone of a moving image signal on the basis of the tone conversion lookup table (tone conversion function) recorded in the tone conversion lookup table storage unit 140, and generates a moving image signal corrected by this correction processing.

The display control unit 20 displays, on the display panel 30, the video image whose tone has been corrected, by driving/controlling the display panel 30 using an LCD (Liquid Crystal Display) panel, OLED (Organic Light Emitting Diode) panel, PDP (Plasma Display Panel), or the like on the basis of the corrected moving image signal.

The operation of the image processing function 100 having the above arrangement will be described next.

The moving image signal to be corrected by the image processing function 100 according to the present invention exemplifies the moving image signal contained in the TV signal sent by terrestrial digital television broadcasting (terrestrial digital broadcasting). After this terrestrial digital broadcast signal is received via the antenna 4, the terrestrial digital reception unit 3 extracts and demodulates a broadcast signal corresponding to the channel designated by the control unit 1, and sends the resultant signal as a TS packet to the video decoder 2. Although a terrestrial digital broadcast signal contains a coded audio signal, a description of an arrangement necessary for processing of the audio signal and the processing of the audio signal is omitted because the present invention is targeted to processing of a moving image signal.

Of the TS packets extracted by the terrestrial digital reception unit 3, a TS packet containing a moving image signal is sent to the video decoder 2.

The video decoder 2 reconstructs a PES (Packetized Elementary Stream) packet by combining the payloads of a plurality of TS packets received from the terrestrial digital reception unit 3, extracts the coded moving image signal contained in the payload of the PES packet, and decodes the signal, thereby reconstructing a moving image signal. In terrestrial digital broadcasting for cellular phones, moving images are coded by a coding scheme called H. 264, and hence the video decoder 2 performs decoding processing in accordance with this coding scheme.

The video decoder 2 outputs the moving image signal reconstructed in this manner to the control unit 1. The image processing function 100 performs tone correction for this signal.

FIG. 3 is a flowchart for explaining the operation of each component constituting the image processing function 100. The processing shown in FIG. 3 is executed for each moving image frame constituting a moving image signal. The processing will be described below with reference to FIG. 3.

In step 3a, the histogram generating function 110 counts the number of pixels included in each of predetermined tone ranges on the basis of a moving image signal (YUV signal) corresponding to one moving image frame input from the video decoder 2. If, for example, an input tone comprises eight bits, a frequency distribution for each tone from 0 to 255 can be obtained.

Figure 4:
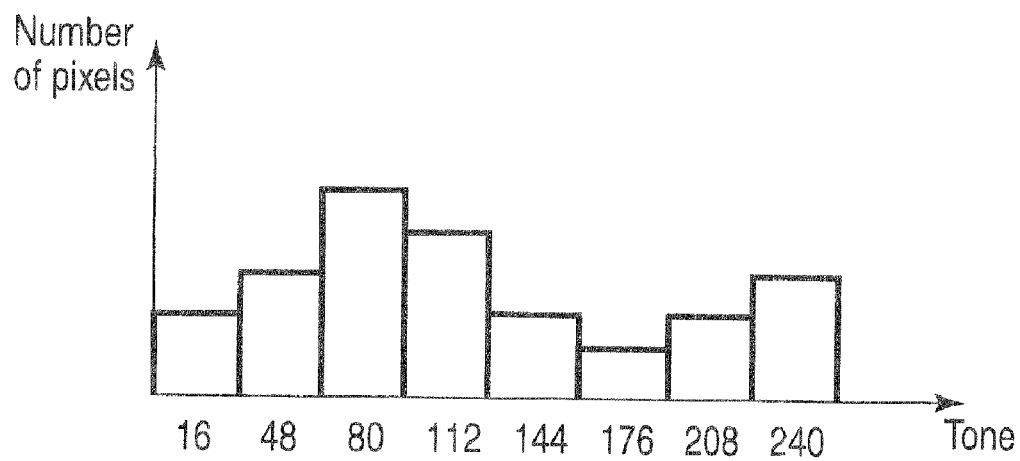
FIG. 4 is a graph for explaining the processing of generating a histogram.

The histogram generating function 110 then generates, on the basis of this count result, a histogram in which a tone (representative tone) representing each tone range is made to correspond to a frequency (the number of pixels) included in the tone range. If the width of a tone range is 32, for example, a histogram like that shown in FIG. 4 is obtained. The numerical values written on the abscissa are the values of the representative tones.

Although various formats can be assumed to be used for moving image signals, this embodiment exemplifies a moving image signal comprising a YUV signal. In addition, the histogram generating function 110 will be described by exemplifying a case in which the histogram of Y signals is generated. Note that if an input video signal is an RGB signal, the histogram generating function 110 may generate a histogram by using the lightness of each RGB signal, which is the highest tone.

In step 3a, the image processing function 100 generates a histogram for each predetermined tone width, and hence can reduce the memory capacity required for the generation of a histogram. When, for example, a histogram is to be generated every 32 tones, a tone is obtained every 32 tones by expressing each tone by the upper three bits of a signal with the lower five bits being set to 0. Note that if the tone width is set to 1, a histogram is generated for each tone.

In step 3b, the peak luminance gain calculation function 120 calculates an APL (Average Picture Level), which is the frame average luminance of the moving image signal of one moving image frame, from the histogram generated by the histogram generating function 110, and determines a peak luminance gain on the basis of the calculated APL. This operation will be described in detail below.

First of all, the peak luminance gain calculation function 120 calculates an APL according to equation (1) based on the histogram generated by the histogram generating function 110.

$$APL = \frac{\sum_{i=0}^{255} h(i) \cdot i}{\sum_{i=0}^{255} h(i)} \quad (1)$$

where h(i) represents a histogram at a tone i, and APL is the average value of signals. An APL can be calculated by using equation (2). Equation (2) given below is used to further normalize a moving image signal by using gamma conversion used for the correction of the moving image signal.

$$APL = \frac{\sum_{i=0}^{255} h(i) \cdot \left(\frac{i}{255}\right)^{2.2}}{\sum_{i=0}^{255} h(i)} \quad (2)$$

A peak luminance $Y_{Peak}$ is determined in accordance with the gain uniquely determined by the APL. More specifically, as exemplified by FIG. 5, the peak luminance gain calculation function 120 holds (stores) in advance a lookup table having a characteristic that APLs are made to correspond to gains, and a gain value corresponding to the above APL is obtained as a peak luminance gain (gain) by referring to the lookup table. In this lookup table, a gain of 1 or more can be set. A value equal to or more than 1 aims at improving the tonality of a dark scene, and a value less than 1 aims at reducing the power consumption for a bright scene. That is, a gain of 1 or more is set for a dark scene with a small APL, and a gain of less than 1 is set for a bright scene with a large APL. Obviously, it is not necessary to set a gain of less than 1 if the object is to only improve the tonality of a dark scene. Likewise, it is not necessary to set a value more than 1 if the object is to only reduce the power consumption of a bright scene.

Figure 5:
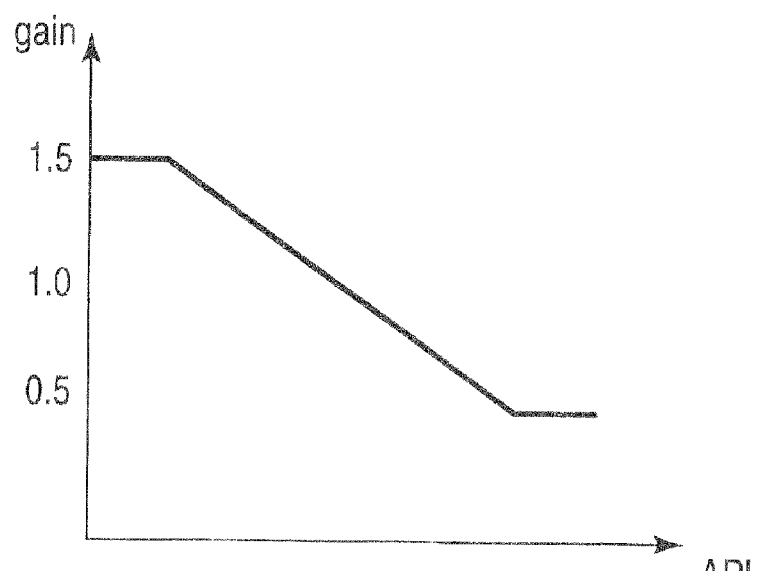
FIG. 5 is a graph for explaining the processing of determining a peak luminance gain.

Note that the relationship between APLs and gains can be a function expressed by a combination of linear line segments, as shown in FIG. 5, or a function modeled by a Gauss distribution. That is, a peak luminance gain can be calculated by arithmetic processing based on a preset function instead of being determined by a technique using the above lookup table.

The peak luminance gain calculation function 120 obtains the peak luminance $Y_{Peak}$ from the obtained peak luminance gain. The peak luminance $Y_{Peak}$ is obtained from the above peak luminance gain by using, for example, equation (3) given below. Note that clip(a, b) in equation (3) represents the clip processing of rounding a to a value equal to or less than b with b being an upper limit, and INT() represents rounding to an integer.

$$Y_{PEAK} = \text{INT}(\text{clip}(\text{gain} \cdot 255, 255)) \quad (3)$$

In step 3c, the tone conversion function calculation function 130 determines whether the peak luminance gain calculated by the peak luminance gain calculation function 120 is less than 1. If the gain is less than 1, the process shifts to step 3d. If the gain is equal to or more than 1, the process shifts to step 3f.

In step 3d, the tone conversion function calculation function 130 defines an ideal tone—brightness characteristic G(y) to be displayed on the display panel 30 as expressed by equation (4) given below, which is stored in the tone conversion function calculation function 130 in advance. The process then shifts to step 3e. That is, in step 3d, the characteristic obtained by extending dynamic range expressed by equation (4) given below by one time is defined as the characteristic G(y). Note that equation (4) given below represents that a video having an 8-bit tone is normalized with the maximum value of brightness which can be reproduced by the display panel 30, and is indicated by the chain double-dashed line in FIG. 6.

$$G(y) = \left(\frac{y}{255}\right)^{2.2} \quad (4)$$

If a tone—lightness characteristic using the lightness defined in a uniform color space is to be used as the characteristic G(y), equation (5) given below can be used. The tone conversion function calculation function 130 stores equation (5) in advance.

$$G_{L^*}(y) = G(y)^{1/3} \quad (5)$$

In step 3e, the tone conversion function calculation function 130 defines a tone—brightness characteristic g(y) of the display panel 30 as the ideal tone—brightness characteristic G(y) expressed by the following equation because the maximum value of the ideal tone—brightness characteristic G(y) is a value which can be reproduced by the display panel 30. The process then shifts to step 3h.

$$g(y) = G(y)$$

If g(y) is used as a tone—lightness characteristic, the characteristic is defined as follows:

$$g_{L^*}(y) = G_{L^*}(y)$$

In step 3f, the tone conversion function calculation function 130 defines the ideal tone—brightness characteristic G(y) to be displayed on the display panel 30 as the following equation on the basis of equation (4) stored in advance. The process then shifts to step 3g. That is, in step 3f, the characteristic obtained by multiplying the dynamic range represented by equation (4) by peak luminance gain (gain) times, and is indicated by the solid line in FIG. 6. Note that the following equation represents that the characteristic normalized by the maximum value of brightness which can be reproduced by the display panel 30 is multiplied by the gain, unlike in step 3d. Therefore, since the gain is more than 1, G(y) includes a tone y having a value larger than 1, and indicates the brightness which cannot be reproduced by the display panel 30.

$$G(y) = \text{gain} \cdot \left(\frac{y}{255}\right)^{2.2}$$

In addition, if a tone—lightness characteristic using the lightness defined in a uniform color space is used as the characteristic G(y), the following equation can be used on the basis of equation (5) stored by the tone conversion function calculation function 130 in advance.

$$G_{L^*}(y) = \text{gain}\left\{\left(\frac{y}{255}\right)^{2.2}\right\}^{1/3}$$

Figure 6:
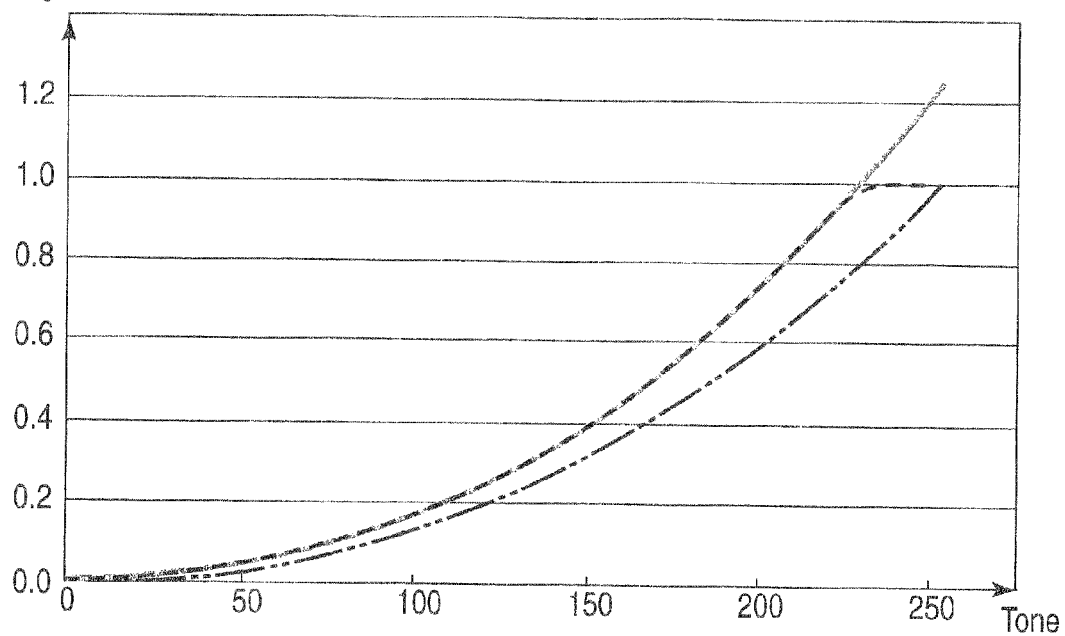
FIG. 6 is a graph for explaining characteristics used for the processing of determining a tone conversion function.

In step 3g, the tone conversion function calculation function 130 defines the tone—brightness characteristic g(y) of the display panel 30 as the following equation because the ideal tone—brightness characteristic G(y) may become a value equal to or more than 1 and exceed the dynamic range which can be reproduced by the display panel 30. The process then shifts to step 3h. Referring to FIG. 6, the tone—brightness characteristic g(y) is indicated by the broken line.

$$g(y)=\text{clip}(G(y),1.0)$$

where clip(a, b) represents the clip processing of rounding a to a value equal to or less than b with b being an upper limit.

Note that if g(y) is used as a tone—lightness characteristic, the characteristic is defined as follows:

$$g_{L'}(y)=\text{clip}(G_{L'}(y),1.0)$$

In step 3h, the tone conversion function calculation function 130 obtains a tone conversion function f(y) representing the relationship between an input tone y and an output tone Y on the basis of the ideal tone—brightness characteristic G(y), the tone—brightness characteristic g(y) of the panel, and the histogram.

Figure 7:
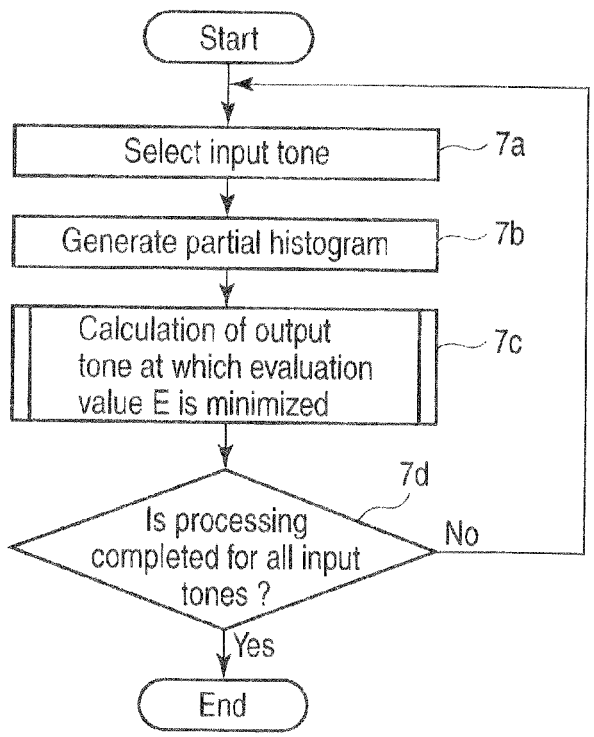
FIG. 7 is a flowchart for explaining the processing of determining a tone conversion function.

The detailed processing in step 3h will be described below with reference to FIG. 7. FIG. 7 is a flowchart showing the processing of obtaining the tone conversion function f(y). In this processing, the tone conversion function calculation function 130 obtains the output tone Y which minimizes an evaluation value E by changing an input tone Xt as an evaluation target, and sets the obtained tone as f(Xt), thereby completing the tone conversion function f(y). Although input tones take discrete values for a reduction in processing load, output tones between them can be obtained as continuous output tones by linear interpolation. Obviously, output tones can be obtained for the respective continuous values of input tones.

Assume that in the following description, the histogram obtained by the histogram generating function 110 upon setting the width of a tone range to 32 is as exemplified by FIG. 4. For this reason, the output tone corresponding to the input tone 0 is set to 0, and the output tone corresponding to the input tone 255 is set to the peak luminance $Y_{Peak}$ obtained by the peak luminance gain calculation function 120.

In step 7a, the tone conversion function calculation function 130 selects one tone from the tone range of the histogram obtained by the histogram generating function 110, and sets it as an input tone Xt. The process then shifts to step 7b. The following is an algorithm for selection.

Figure 8:
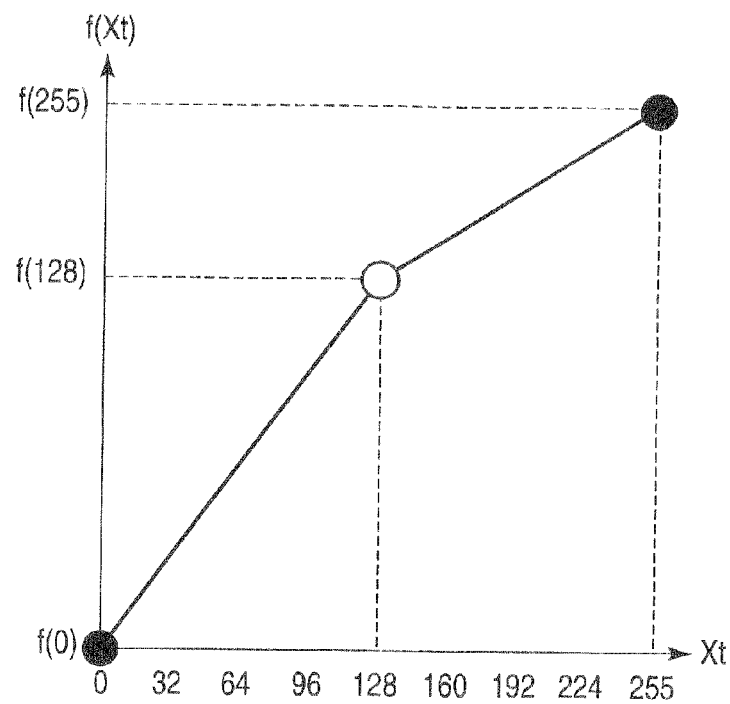
FIG. 8 is a graph for explaining the processing of determining a corrected output tone.
Figure 9:
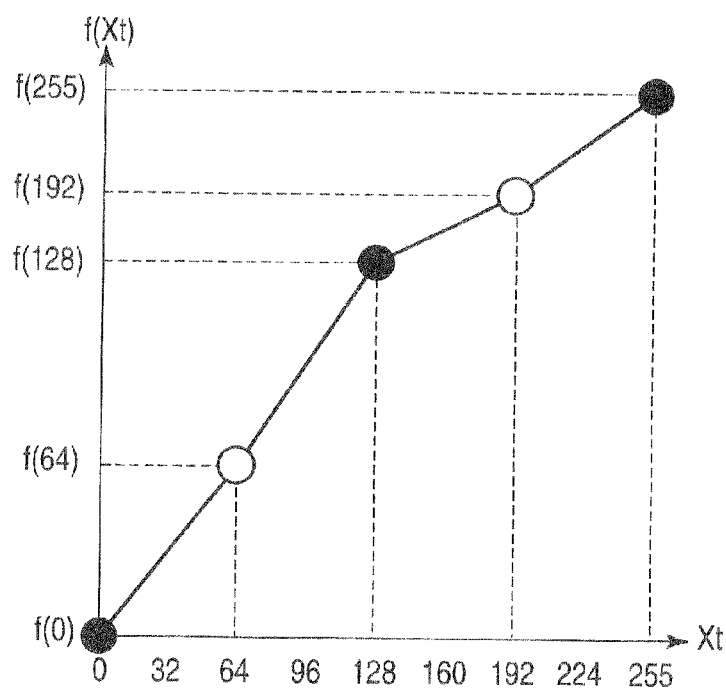
FIG. 9 is a graph for explaining the processing of determining a corrected output tone.

In first step 7a, as shown in FIG. 8, the tone conversion function calculation function 130 selects the tone 128 existing between the tone 0 and the tone 255, and sets it as the input tone Xt (=y) as a processing target. In second step 7a after step 7d, as shown in FIG. 9, the tone conversion function calculation function 130 sets the tone 64 existing between the tone 0 and the tone 128 as the input tone Xt as a processing target. Likewise, in a third step 7a, as shown in FIG. 9, the tone conversion function calculation function 130 sets the tone 192 existing between the tone 128 and the tone 255 as the input tone Xt as a processing target.

Subsequently, similar processing is repeated every time the process shifts to step 7a. That is, the tone conversion function calculation function 130 sets the tone 32 existing between the tone 0 and the tone 64 as the input tone Xt, the tone 96 existing between the tone 64 and the tone 128 as the input tone Xt, the tone 160 existing between the tone 128 and the tone 192 as the input tone Xt, and the tone 224 existing between the tone 192 and the tone 255 as the input tone Xt. In this manner, the input tone Xt is set for every 32 tones by sequentially selecting intermediate values.

Figure 10:
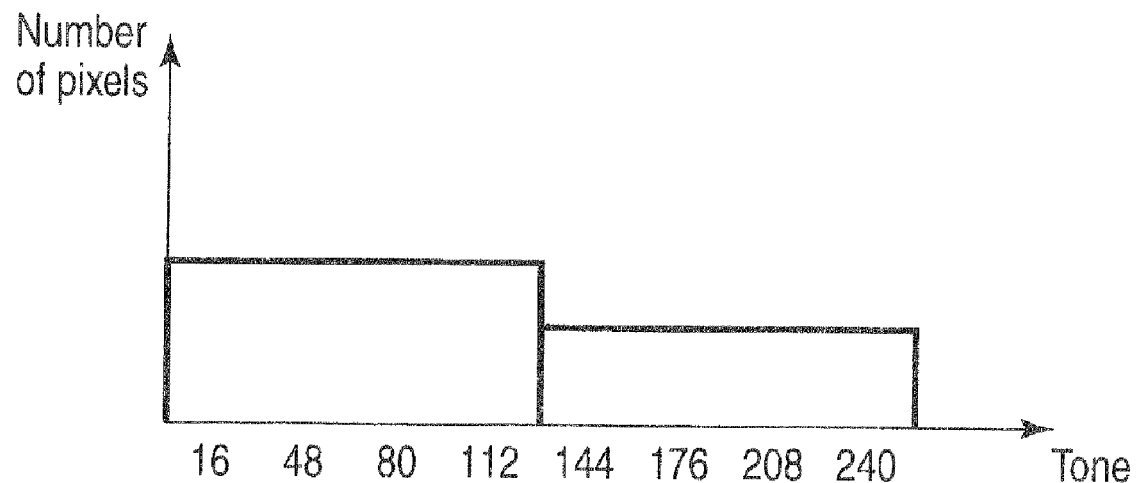
FIG. 10 is a graph for explaining the processing of generating partial histograms.

In step 7b, the tone conversion function calculation function 130 calculates two partial histograms on the two sides of the input tone Xt on the basis of the input tone Xt set in step 7a. The process then shifts to step 7c. More specifically, if the first set input tone Xt is 128, as shown in FIG. 8, the tone conversion function calculation function 130 obtains two partial histograms having a bin starting from the tone 0 to the tone 127 and a bin starting from the tone 128 to the tone 255, as shown in FIG. 10.

These partial histograms are obtained according to the following equations. In the following equations, H(i0, i1) represents the frequency obtained by adding up frequencies h(x) of tones x from a tone i0 and a tone i1 obtained by the histogram generating function 110.

$$H(0, 127) = \sum_{i=0}^{127} h(i)$$

$$H(128, 255) = \sum_{i=128}^{255} h(i)$$

Figure 11:
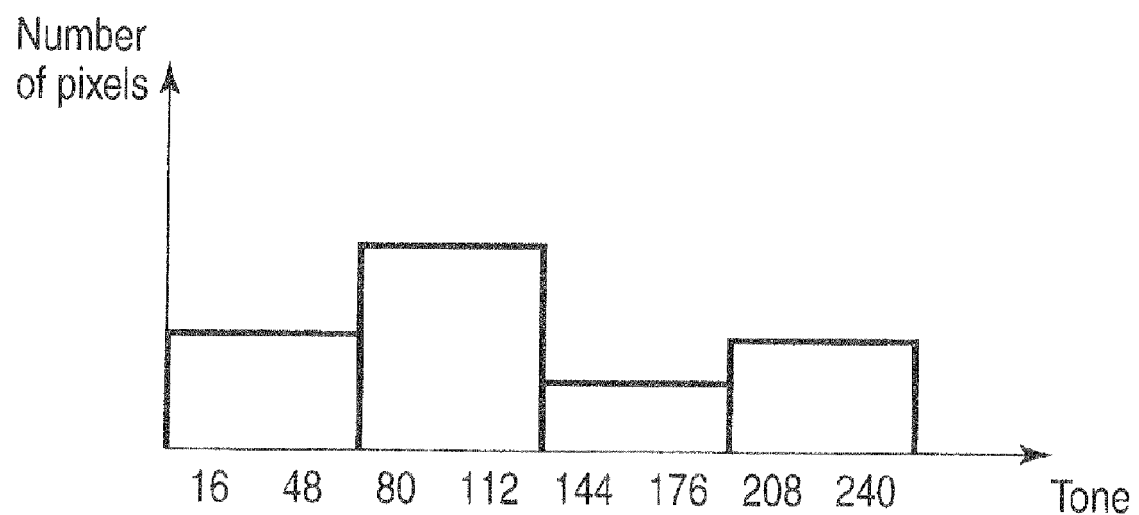
FIG. 11 is a graph for explaining the processing of generating partial histograms.

Likewise, when 64 is selected as the tone Xt in step 7a, a partial histogram from the tone 0 to the tone 63 and a partial histogram from the tone 64 to the tone 127 are obtained, as shown in FIG. 11. When 192 is selected as the tone Xt in step 7a, a partial histogram from the tone 128 to the tone 191 and a partial histogram from the tone 192 to the tone 255 are obtained.

Figure 12:
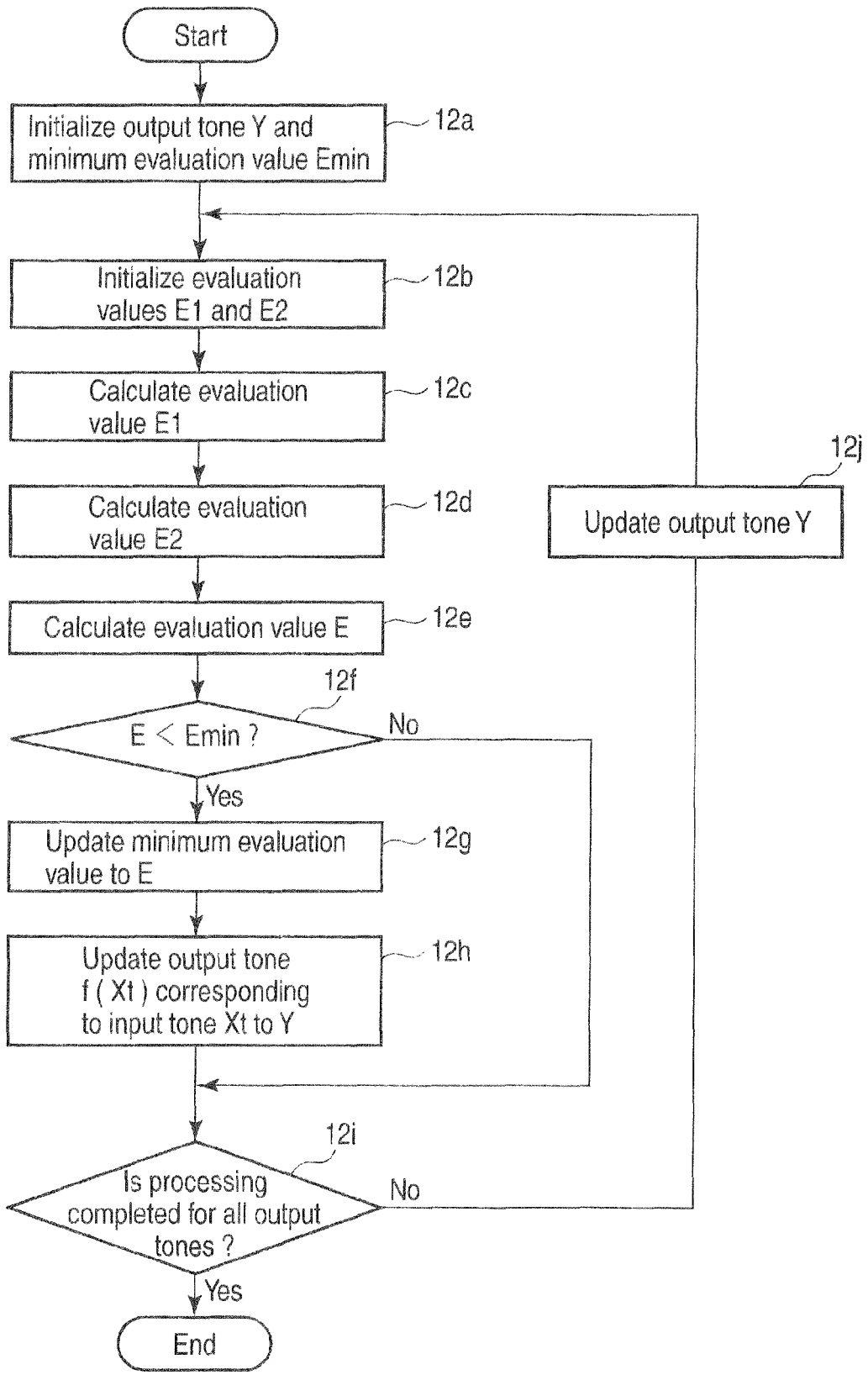
FIG. 12 is a flowchart for explaining the processing of determining a corrected output tone.

In step 7c, the tone conversion function calculation function 130 calculates, as Y=f(Xt), a value which minimizes the evaluation value E of the output tone Y corresponding to the set input tone Xt. The process then shifts to step 7d. The processing in step 7c will be described in detail below with reference to the flowchart shown in FIG. 12.

In step 12a, the tone conversion function calculation function 130 initializes the output tone Y and a minimum evaluation value $E_{min}$ which are used as variables in this processing. The process then shifts to step 12b. These values are initialized by setting values represented by the following equations, respectively. Note that MAX_VAL is a sufficiently large value set in advance, and in the conversion function f(x), the values at the tones 0 and 255 are respectively set to 0 and $Y_{Peak}$, and the values calculated by linear interpolation are set as the initial values of the values from the tone 1 to the tone 254.

$$Y=f(x_0)$$

$$E_{min}=\text{MAX\_VAL}$$

In the following processing as well, as described with reference to FIG. 7, the output tone corresponding to the input tone 0 is set to 0, and the output tone corresponding to the input tone 255 is set to the peak luminance $Y_{Peak}$ obtained by the peak luminance gain calculation function 120. In the following description, $X_0$ represents the minimum tone in a tone range corresponding to the input tone Xt set in step 7a, and $X_1$ represents the maximum tone in the tone range corresponding to the input tone Xt. For example, as shown in FIG. 8, if the input tone Xt is 128, $X_0$ is the tone 0, and $X_1$ is the tone 255. Likewise, as shown in FIG. 9, if the input tone Xt is 64, $X_0$ is the tone 0, and $X_1$ is the tone 128.

In step 12b, the tone conversion function calculation function 130 initializes first and second evaluation values E1 and E2 as indicated by the following equations. The process then shifts to step 12c.

$$E1=0$$

$$E2=0$$

In step 12c, the tone conversion function calculation function 130 obtains the first evaluation value E1. First of all, the tone conversion function calculation function 130 obtains the ideal brightness of the input tone Xt from the tone—brightness characteristic G(y) obtained in step 3d or 3f (y=Xt). In addition, the tone conversion function calculation function 130 obtains the brightness of the panel which corresponds to the output tone Y from the tone—brightness characteristic g(y) obtained in step 3e or 3g in the previous sequence (y=Y).

The tone conversion function calculation function 130 then obtains the first evaluation E1 according to the following equation. That is, the tone conversion function calculation function 130 obtains the first evaluation value E1 by multiplying the difference between G(Xt) and g(Y) by the sum of the two partial histograms obtained in step 7b as a weight. The process then shifts to step 12d.

$$E1=|G(Xt)-g(y)|\cdot(H(x0,xt-1)+H(xt,x1))$$

Note that the first evaluation value E1 can also be obtained on the basis of a square error as indicated by the following equation:

$$E1=|G(Xt)-g(y)|\cdot(H(x0,xt-1)+H(xt,x1))$$

In addition, the first evaluation value E1 may be the square sum of the differences between the values based on the above tone—lightness characteristic instead of the values based on the tone—brightness characteristic.

$$E1=\{G(Xt)-g(y)\}^2\cdot((x0,xt-1)+H(xt,x1))$$

In step 12d, the tone conversion function calculation function 130 obtains the second evaluation value E2. First of all, the tone conversion function calculation function 130 obtains the input tone Xt and ideal brightnesses at the minimum tone $X_0$ and the maximum tone $X_1$ in the tone range including the input tone Xt as an intermediate tone from the tone—brightness characteristic G(y) obtained in step 3d or 3f in the previous sequence. That is, the tone conversion function calculation function 130 calculates G(Xt), G($X_0$), and G($X_1$).

The tone conversion function calculation function 130 then obtains the first derivative of the tone—brightness characteristic G(y) in the above tone range. In this case, the tone conversion function calculation function 130 obtains a gradient characteristic in the above tone range by using the above calculation result according to the following equations. That is, for the sake of simple calculation, a gradient is obtained by using a difference in place of a derivative.

$$\Delta G(X0,Xt)=G(Xt)-G(X0)$$

$$\Delta G(Xt,X1)=G(X1)-G(Xt)$$

Likewise, the tone conversion function calculation function 130 obtains the input tone Xt and the brightnesses of the panel at the minimum tone $X_0$ and maximum tone $X_1$ in the tone range including the input tone Xt as an intermediate tone from the tone—brightness characteristic g(y) obtained in step 3e or 3g in the previous sequence. That is, the tone conversion function calculation function 130 calculates g(Xt), g($X_0$), and g($X_1$).

The tone conversion function calculation function 130 then obtains the first derivative of the tone—brightness characteristic g(y) in the above tone range. In this case, the tone conversion function calculation function 130 obtains a gradient characteristic in the above tone range by using the above calculation result according to the following equations. That is, for the sake of simple calculation, a gradient is obtained by using a difference in place of a derivative.

$$\Delta g(f(X0),y)=g(y)-g(f(X0))$$

$$\Delta g(y,f(X1))=g(f(X1))-g(y)$$

The tone conversion function calculation function 130 then obtains the second evaluation E2 according to the following equation. That is, the tone conversion function calculation function 130 obtains the second evaluation value E2 by multiplying the differences between the gradients of the respective tone ranges by the sum of the two partial histograms obtained in step 7b as a weight and adding them. The process then shifts to step 12e.

$$E2=|\Delta G(X0,Xt)-\Delta g(f(X0),y)|\cdot H(X0,Xt-1)+\Delta G(Xt,X1)-\Delta g(y,f(X1))|\cdot H(Xt,X1)$$

Note that the second evaluation value E2 can also be obtained on the basis of a square error as indicated by the following equation:

$$E2=\{\Delta G(X0,Xt)-\Delta g(f(X09),y)\}^2\cdot H(X0,Xt-1)+\{\Delta G(Xt,X1)-\Delta g(y,f(X1))\}^2\cdot H(Xt,X1)$$

In addition, the second evaluation value E2 may be the square sum of the differences between the values based on the above tone—lightness characteristic instead of the values based on the tone—brightness characteristic, as indicated by the following equation.

$$E2=\{\Delta G_L\cdot(X0,Xt)-\Delta g_L\cdot(f(X0))\}^2\cdot H(X0,Xt)+\{\Delta G_L\cdot(Xt,X1)-\Delta g_L\cdot(y,f(X1))\}^2\cdot H(Xt,X1)$$

In step 12e, the tone conversion function calculation function 130 obtains the evaluation value E according to the following equation. That is, the tone conversion function calculation function 130 obtains, as the evaluation value E, the linear sum of the values obtained by weighting the first and second evaluation values E1 and E2. Let λ be a weight which is arbitrarily set in advance in the range of 0 to 1.

$$E=\lambda\cdot E1+(1-\lambda)\cdot E2$$

In step 12f, the tone conversion function calculation function 130 compares the evaluation value E obtained in step 12e with the minimum evaluation value Emin. If the evaluation value E is smaller than the minimum evaluation value Emin, the process shifts to step 12g. If the evaluation value E is equal to or larger than the minimum evaluation value Emin, the process shifts to step 12i.

In step 12g, the tone conversion function calculation function 130 updates the minimum evaluation value Emin with the evaluation value E. The process then shifts to step 12h. With this operation, the minimum evaluation value Emin is updated to a smaller value.

In step 12h, the tone conversion function calculation function 130 records Y as the output tone f(Xt) corresponding to the input tone Xt in the tone conversion lookup table storage unit 140. The process then shifts to step 12i. With this operation, if, for example, the input tone Xt is 128, Y is recorded as f(128) in the tone conversion lookup table storage unit 140, as shown in FIG. 8. As shown in FIG. 9, if the input tone Xt is 64, Y is recorded as f(64) in the tone conversion lookup table storage unit 140. Likewise, if, for example, the input tone Xt is 192, Y is recorded as f(192) in the tone conversion lookup table storage unit 140, as shown in FIG. 9.

In step 12*i*, the tone conversion function calculation function 130 determines whether the output tone Y has reached a preset upper limit $f(X_1)$. That is, the tone conversion function calculation function 130 determines whether all the candidate values are evaluated. If all the candidate values are evaluated, this processing is terminated. The process then shifts to step 7*d*. If all the candidate values are not evaluated, the process shifts to step 12*j*. Note that the above upper limit is set to about an output tone corresponding to the maximum value $X_1$ in a tone range including the input tone Xt as an intermediate tone.

In step 12*j*, the tone conversion function calculation function 130 increments the value of the output tone Y by one. The process then shifts to step 12*b*.

In step 7*d*, the tone conversion function calculation function 130 determines whether all the tone ranges are processed upon setting of the input tone Xt. If all the tone ranges are processed, the processing is terminated, and the process shifts to step 3*i*. That is, with the processing shown in FIG. 12, a tone conversion lookup table (tone conversion function f(y)) is completed.

If all the tone ranges are not processed, i.e., the lookup table is not completed, the process shifts to step 7*a* to process the remaining tone range.

In step 3*i*, the tone-converted image generating function 150 executes the correction processing of correcting the tone of an input video signal on the basis of the tone conversion lookup table (tone conversion function f(y)) recorded in the tone conversion lookup table storage unit 140. With this correction processing, a moving image signal having a corrected tone is generated.

The display control unit 20 drives/controls the display panel 30 on the basis of the corrected moving image signal. A video signal is then displayed on the display panel 30 on the basis of the image whose tone is corrected.

As described above, the image processing function 100 having the above arrangement generates a lookup table (tone conversion function) for obtaining an output tone by correcting an input tone on the basis of histograms and gains corresponding to peak luminances, and corrects the tone of a moving image signal on the basis of the table.

For a dark scene with a small APL and a gain of 1 or more, letting the panel have a function incapable of reproducing the ideal tone—brightness characteristic G(y) makes it possible to improve the tonality without causing tone collapse by tone conversion processing using histograms while increasing the sense of brightness, which cannot be reproduced by the panel, in a pseudo manner.

In contrast to this, for a bright scene with a large APL and a gain of less than 1, it is possible to reduce the power consumption without degrading the subjective sense of contrast by executing tone correction to restore the sense of contrast which the ideal tone—brightness characteristic G(y) has with priority given to the sense of contrast at a highly frequent tone on the basis of histograms, while the maximum tone is suppressed to the peak luminance $Y_{Peak}$.

According to the image processing function having the above arrangement, therefore, since tone correction is performed for a dark portion by converting the tone of an input moving image signal in accordance with the moving image signal, the tonality of a scene with low visibility, e.g., a dark scene, can be improved even with a low luminance setting. In addition, the power for a scene in which the power consumption increases, e.g., a bright scene, can be reduced.

Note that the present invention is not limited to the above embodiments, and constituent elements can be variously modified and embodied at the execution stage within the spirit and scope of the invention. Various inventions can be formed by proper combinations of a plurality of constituent elements disclosed in the above embodiments. For example, several constituent elements may be omitted from all the constituent elements in each embodiment. In addition, constituent elements of the different embodiments may be combined as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising a control unit configured to function as:
    a histogram generator configured to generate a histogram of an input video signal;
    a gain calculator configured to calculate a peak luminance gain of the input video signal based on the histogram;
    a dynamic range extending module configured to extend a dynamic range of a preset first characteristic between tone and brightness in accordance with the peak luminance gain to output an extended first characteristic;
    a function generator configured to generate a tone conversion function based on the extended first characteristic, a second characteristic between tone and brightness of a display panel for displaying the input video signal, and the histogram, wherein the function generator is configured to calculate a difference between a gradient of the extended first characteristic and a gradient of the second characteristic and to multiply the difference by a value relating to the histogram in order to generate the tone conversion function; and
    a tone converter configured to convert a tone of the input video signal based on the tone conversion function.

2. The apparatus according to claim 1, wherein the gain calculator comprises:
    a table storage configured to store a lookup table in which average luminances correspond to peak luminance gains;
    an average luminance calculator configured to calculate an average luminance of the input video signal based on the histogram; and
    a table reference module configured to read, from the lookup table, a peak luminance gain corresponding to the average luminance calculated by the average luminance calculator.

3. The apparatus according to claim 1, wherein the dynamic range extending module is configured to extend the dynamic range of the first characteristic when the peak luminance gain is not less than a preset value.

4. The apparatus according to claim 1, wherein the dynamic range extending module is configured to clip a range of a tone of the extended first characteristic when the extended first characteristic exceeds the second characteristic.

5. An image processing method comprising:
    generating a histogram of an input video signal;
    calculating a peak luminance gain of the input video signal based on the histogram;
    extending a dynamic range of a preset first characteristic between tone and brightness in accordance with the peak luminance gain to output an extended first characteristic;
    calculating a difference between a gradient of the extended first characteristic and a gradient of a second characteristic between tone and brightness of a display panel for displaying the input video signal;

multiplying the difference and a value relating to the histogram in order to generate a tone conversion function; and converting a tone of the input video signal based on the tone conversion function.

6. The method according to claim 5, wherein calculating the peak luminance gain comprises:

calculating an average luminance of the input video signal based on the histogram, and reading, from a lookup table in which average luminances correspond to peak luminance gains, a peak luminance gain corresponding to the calculated average luminance.

7. The method according to claim 5, wherein extending the dynamic range comprises extending the dynamic range of the preset first characteristic when the peak luminance gain is not less than a preset value.

8. The method according to claim 5, wherein extending the dynamic range comprises clipping a range of a tone of the extended first characteristic when the extended first characteristic exceeds the second characteristic.

* * * * *